(12) United States Patent
Iwamoto et al.

(10) Patent No.: US 10,266,735 B2
(45) Date of Patent: Apr. 23, 2019

(54) RESIN FORMED BODY HAVING SURFACE THAT EXHIBITS EXCELLENT WATER-SLIDING PROPERTY

(71) Applicant: TOYO SEIKAN GROUP HOLDINGS, LTD., Tokyo (JP)

(72) Inventors: Shinya Iwamoto, Yokohama (JP); Yosuke Akutsu, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 348 days.

(21) Appl. No.: 14/896,721

(22) PCT Filed: Jun. 24, 2014

(86) PCT No.: PCT/JP2014/066615
§ 371 (c)(1),
(2) Date: Dec. 8, 2015

(87) PCT Pub. No.: WO2015/002012
PCT Pub. Date: Jan. 8, 2015

(65) Prior Publication Data
US 2016/0130487 A1    May 12, 2016

(30) Foreign Application Priority Data
Jul. 2, 2013  (JP) .................. 2013-139017

(51) Int. Cl.
*C09K 3/18*  (2006.01)
*C08J 7/04*  (2006.01)
*C08K 9/06*  (2006.01)

(52) U.S. Cl.
CPC .............. *C09K 3/18* (2013.01); *C08J 7/047* (2013.01); *C08K 9/06* (2013.01); *C08J 2367/02* (2013.01);
(Continued)

(58) Field of Classification Search
CPC ...... C08K 2201/013; C08K 9/06; C08K 3/36; C08K 3/34; C08K 9/04; C08K 5/20;
(Continued)

(56) References Cited
U.S. PATENT DOCUMENTS

2009/0263653 A1  10/2009  Yamamoto et al.
2010/0092621 A1  4/2010  Akutsu et al.
(Continued)

FOREIGN PATENT DOCUMENTS

CN     101474895 A    7/2009
JP     2001-131318 A  5/2001
(Continued)

OTHER PUBLICATIONS

Cabot Specialty Hydrophobic fumed silica, accessed online Nov. 17, 2017.*
(Continued)

*Primary Examiner* — Camie S Thompson
(74) *Attorney, Agent, or Firm* — Sughrue Mion, PLLC

(57) ABSTRACT

A resin formed body 10 having a surface in which hydrophobic fine particles 11 are distributed, the hydrophobic fine particles having a BET specific surface area of not less than 300 m²/g. Despite the hydrophobic fine particles are added in a small amount, the resin formed body exhibits a high water-sliding property and can be used also in the form of a film and a bottle.

12 Claims, 1 Drawing Sheet

(52) U.S. Cl.
CPC ..... *C08J 2467/02* (2013.01); *C08K 2201/013* (2013.01)

(58) Field of Classification Search
CPC .... C09K 3/18; C09K 9/06; C23C 4/10; C03C 17/30; C03C 2217/76; D06M 2201/12; B65D 43/02; B65D 1/00; B65D 1/02; B65D 1/32; B65D 53/04; B65D 65/00; B65D 65/40; B65D 77/00; B65D 77/20; B65D 25/14; B65D 25/34; B32B 2307/73; B32B 2439/00; B32B 2439/60; B32B 2255/20; B32B 37/24; B32B 5/16; B32B 27/00; B32B 27/20; B32B 27/18; B32B 2255/26; B32B 2255/28; B32B 2435/02; B32B 27/10; B29C 2059/028; B29K 2995/0093; Y10T 428/13; Y10T 428/254; Y10T 428/259; C08J 7/06; C08J 7/00; C08J 2367/02; C08J 2467/02; C08L 33/00; C08L 23/00
USPC ....... 428/36.4, 341, 327, 331, 323; 524/493; 523/216
See application file for complete search history.

(56) References Cited

U.S. PATENT DOCUMENTS

| | | | |
|---|---|---|---|
| 2012/0045954 A1* | 2/2012 | Bleecher | C09D 7/1225 442/80 |
| 2012/0118886 A1 | 5/2012 | Sekiguchi et al. | |
| 2012/0142814 A1* | 6/2012 | Kanagasabapathy | C08K 3/36 523/175 |
| 2014/0332570 A1 | 11/2014 | Akutsu et al. | |
| 2015/0017334 A1 | 1/2015 | Sekiguchi et al. | |

FOREIGN PATENT DOCUMENTS

| | | | |
|---|---|---|---|
| JP | 2007-138095 | A | 6/2007 |
| JP | 2007-284066 | A | 11/2007 |
| JP | 2008-222291 | A | 9/2008 |
| JP | 2009185201 | A | 8/2009 |
| JP | 2009-214914 | A | 9/2009 |
| JP | 2009-262552 | A | 11/2009 |
| JP | 2010-132839 | A | 6/2010 |
| JP | 2010-184454 | A | 8/2010 |
| JP | 2010-237585 | A | 10/2010 |
| JP | 2010-254377 | A | 11/2010 |
| JP | 2011-093315 | A | 5/2011 |
| JP | 2012-017116 | A | 1/2012 |
| JP | 4878650 | B1 | 2/2012 |
| JP | 2012-041049 | A | 3/2012 |
| JP | 2013-039930 | A | 2/2013 |
| JP | 2013-091289 | A | 5/2013 |
| JP | 2013103751 | A | 5/2013 |
| JP | 2013-107676 | A | 6/2013 |
| WO | 2010/093002 | A1 | 8/2010 |
| WO | WO2013077380 | * | 5/2013 |

OTHER PUBLICATIONS

International Search Report of PCT/JP2014/066615 dated Sep. 30, 2014.
Communication dated Oct. 10, 2016, from the State Intellectual Property Office of the P.R.C. in counterpart Chinese application No. 201480037721.8.
Communication dated May 23, 2017, from the Japanese Patent Office in counterpart application No. 2013-139017.
Communication dated Feb. 2, 2017, issued by the European Patent Office in corresponding European Application No. 14819521.7.
A. Venkateswara Rao et al., "Water repellent porous silica films by sol-gel dip coating method", Journal of Colloid and Interface Science, vol. 352, 2010, pp. 30-35.
Communication dated Dec. 18, 2018, from Japanese Office Action from counterpart application No. 2017-234066.

* cited by examiner

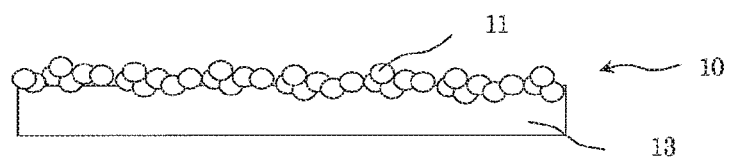

RESIN FORMED BODY HAVING SURFACE THAT EXHIBITS EXCELLENT WATER-SLIDING PROPERTY

CROSS REFERENCE TO RELATED APPLICATIONS

This is a National Stage of International Application No. PCT/JP2014/066615 filed Jun. 24, 2014, claiming priority based on Japanese Patent Application No. 2013-139017 filed Jul. 2, 2013, the contents of all of which are incorporated herein by reference in their entirety.

TECHNICAL FIELD

This invention relates to a resin formed body having a surface that exhibits excellent. water-sliding property.

BACKGROUND ART

Plastic materials are easily to form, can be inexpensively produced, have good resistance against the chemicals, and, besides, are rich in softness and flexibility, and have, therefore, been used for a variety of applications and, specifically, for daily necessaries and for packing materials.

In recent years, there have been developed highly functional materials improving surface properties such as wettability and the like. Viscous contents tend to adhere onto the inner surfaces of the packing materials. To solve this problem, the following documents are disclosing the materials that are newly developed having surface properties that work to keep the contents from adhering or enable the contents to slide down.

Patent documents 1 and 2 are disclosing packing materials such as containers and lids having surfaces (inner surfaces) on which hydrophobic fine oxide particles (e.g. , hydrophobic silica) are deposited having an average primary particle diameter of 3 to 100 nm and a BET specific surface area of 50 to 300 $m^2/g$. These packing materials have such surface properties that the water-containing substances such as yogurt and the like adhere thereto difficultly.

A patent document 3 is proposing a lid of which the surface is coated with a water-repelling film of a structure formed by dispersing or depositing fine oxide particles having an average particle diameter of 5 nm to 100 nm on the surface of a resin film formed by using resin particles of an average particle diameter of 1 to 20 µm.

According to the arts proposed in the patent documents 1 and 2, the surface to which the content comes in contact is formed to be finely rugged, fine oxide particles are deposited on the finely rugged surface so as to express water-repelling property (hydrophobic property) , and property that do not adhere to the water-containing substances is expressed by the hydrophobic property.

The above arts are satisfactory in regard to the property of not adhering to the water-containing substances but are still unsatisfactory in regard to sliding property (slide-down property). Therefore, further improvements are necessary concerning the property for sliding down viscous water-containing substances.

Further, a patent document 4 is proposing a bottle of a multilayer structure including an innermost layer of an olefin resin that has an MFR (melt flow rate) of not less than 10 g/10 min.

The innermost layer of this multilayered bottle has excellent wettability for the oily content. Therefore, if the bottle is inverted or tilted, the oily content such as mayonnaise or the like falls down spreading along the surface of the innermost layer and is thoroughly discharged without adhering or remaining on the inner wall surface (innermost layer surface) of the bottle.

As for the bottles for containing viscous non-oily contents in which plant fibers are dispersed in water like ketchup, a patent document 5 and a patent document 6 are disclosing polyolefin resin bottles having an innermost layer which is blended with a saturated or unsaturated aliphatic amide as a lubricating agent.

The above patent documents 4 to 6 are all trying to improve sliding property of the plastic containers for the contents by suitably selecting the kind of the thermoplastic resin that forms the inner surfaces of the containers and the lubricating agent that is added to the resin, and are achieving improvements in the sliding property to some extent. However, limitation is imposed on improving the sliding property, and striking improvement has not been, achieved yet.

According to the above arts, further, the fine oxide particles must be deposited on the surfaces involving a difficulty in that the arts cannot be applied to the containers in the form of, specifically, bottles. This is because with the containers such as blow-formed bottles as representatively formed by stretch-forming, the mouth portion is so narrow that it is difficult to deposit, by blowing, a liquid in which fine oxide particles are dispersed on the inner surfaces of the containers.

It can be, further, contrived to disperse fine oxide particles in a resin that forms the surface, and form the resin into the shape of a bottle so that the fine oxide particles are distributed in the inner surface of the bottle. According to the study by the present inventors, however, it has been confirmed that the fine oxide particles must be dispersed in large amounts to realize the slide-down property to a certain degree.

PRIOR ART DOCUMENTS

Patent Documents

Patent document 1: JP-A-2010-254377
Patent document 2: JP-A-2011-93315
Patent document 3: Japanese Patent No. 4878650
Patent document 4: JP-A-2007-284066
Patent document 5: JP-A-2008-222291
Patent document 6: JP-A-2009-214914

OUTLINE OF THE INVENTION

Problems that the Invention is to Solve

It is, therefore, an object of the present invention to provide a resin formed body having excellent water-sliding property and very high sliding property for viscous water-containing substances, and can be used in such forms as films, bottles, trays and cups.

Means for Solving the Problems

The present inventors have studied the sliding property of when hydrophobic fine particles are distributed in the surface of a resin formed body, and have discovered that very excellent slide-down property can be expressed if there are used hydrophobic fine particles having a BET specific surface area of not less than 300 $m^2/g$, and have thus completed the present invention.

Namely, according to the present invention, there is provided a resin formed body having a surface in which hydrophobic fine particles are distributed, the hydrophobic fine particles having a BET specific surface area of not less than 300 m$^2$/g.

In the present invention, it is desired that:
(1) The surface of the resin formed body in which the hydrophobic fine particles are distributed has a sliding angle of not more than 5°, the sliding angle being defined as a tilt angle of the surface with respect to the horizontal plane and on which a 30 mg of pure water that is dropped thereon slides down thereon (i.e., has water-sliding property that permits pure water to slide down when the surface of the resin formed body is tilted by 5°);
(2) The hydrophobic fine particles are dispersed in the surface resin layer that is forming the surface of the resin formed body, the hydrophobic fine particles, further, being partly distributed in the surface;
(3) The hydrophobic fine particles are added in an amount of 40 to 300 parts by weight per 100 parts by weight of the resin that is forming the surface resin layer;
(4) The hydrophobic fine particles are fine silica particles having a hydrophobic functional group introduced into the surfaces thereof;
(5) The hydrophobic functional group is an alkylsilyl group, an alkyl group, a fluoroalkylsilyl group or a fluoroalkyl group;
(6) The resin formed body has the form of a film, and the hydrophobic fine particles are distributed on the film;
(7) The resin formed body has the form of a bottle, and the hydrophobic fine particles are distributed in an inner surface or in a mouth portion of the bottle;
(8) The resin formed body has the form of a pouring fitting or a cap, and the hydrophobic fine particles are distributed in a portion that turns into a content solution pouring passage in the pouring fitting or in the cap;
(9) The resin formed body has the form of a tray, and the hydrophobic fine particles are distributed on the tray; and
(10) The resin formed body has the form of a cup, and the hydrophobic fine particles are distributed on the cup.

Effects of the Invention

The resin formed body of the present invention has a distinguished feature in that it has a surface in which hydrophobic fine particles are distributed, the hydrophobic fine particles having a BET specific surface area of not less than 300 m$^2$/g. Namely, with the hydrophobic fine particles having such a large specific surface area being distributed, the resin formed body of the invention exhibits very excellent water-sliding property.

For instance, Examples and Comparative Examples appearing later are testing the water-sliding properties on the surfaces of the films formed by using the resin (polyester) blended with the hydrophobic fine particles. There has been described that if hydrophobic fine particles (silica particles) having a BET specific surface area of not less than 300 m$^2$/g are used as contemplated by the present invention, the sliding angle of pure water can be decreased down to less than 1° despite the amount thereof is far smaller than the amount of the resin. If the hydrophobic fine particles having a BET specific surface area of not more than 300 m$^2$/g are used, on the other hand, the sliding angle of pure water cannot be decreased down to be less than 1° unless the amount thereof is made to be considerably larger than the amount of the resin (polyester).

It will, therefore, be understood that if the water-sliding property is expressed by using the hydrophobic fine particles having a BET specific surface of not more than 300 m$^2$/g, then the resin loses its formability to a great extent and, therefore, the hydrophobic fine particles must be externally added (adhered from the outer side). Therefore, the formed bodies such as films and bottles cannot be rendered to exhibit high water-sliding property. If the hydrophobic fine particles having a BET specific surface area not less than 300 m$^2$/g are used as contemplated by the present invention, on the other hand, the water-sliding property can be exhibited despite the amount thereof is small. Therefore, the resin loses its formability little yet exhibiting high water-sliding property.

In the present invention, it was discovered as a phenomenon that a high water-sliding property is exhibited by the surface of a resin formed body if hydrophobic fine particles having a large BET specific surface are distributed therein. Though not theoretically clarified yet, the present inventors speculate the reasons to be as described below.

The hydrophobic fine particles added to the resin have a large BET specific surface area and, therefore, hydrophobic groups effective in exhibiting water-sliding property are distributed in large amounts. Beside, the hydrophobic fine particles having a large BET specific surface area have abundant pores and easily trap the air therein permitting pure water to infiltrate through very little. Accordingly, decreased areas come in contact with the liquid. As a result, it is considered that despite the hydrophobic fine particles are exposed little on the surface of the resin formed body, very excellent water-sliding property is exhibited. Usually, in order for a substance to slide down, a method is contrived to form the slide-down surface rugged by the roughening work or the like work. According to the present invention, however, there is no need of forming the surface rough. This means that the hydrophobic fine particles having a BET specific surface area of not less than 300 m$^2$/g work to easily trap the air.

As described above, the resin formed body of the present invention has excellent water-sliding property and is suited for being used as water-proof fittings such as water-proof sheet and the like. Specifically, the resin formed body of the invention exhibits excellent slide-down property for water-containing substances such as ketchup, sauces, dressings, aqueous pastes and aqueous inks, as well as excellent water-dispelling property if it is formed into a pouring port. Therefore, the resin formed body of the invention can also be very favorably used for containing these substances.

Specifically, the resin formed body of the invention enables the hydrophobic fine particles to be distributed on the surface thereof, i.e., enables the hydrophobic fine particles to be distributed in a portion to where the liquid comes in contact or in a portion that becomes the passage through where the liquid flows imparting, therefore, water-sliding property thereto even if the resin formed body is used in the form of film, bottle, tray or cup, or even if the resin formed body is used in the form of a pouring fitting such as spout or is used in the form of a cap or the like.

BRIEF DESCRIPTION OF THE DRAWING

FIG. 1: A view illustrating the surface state of a resin formed body of the present invention.

MODES FOR CARRYING OUT THE INVENTION

<Hydrophobic Fine Particles>

The resin formed body of the invention has a surface in which the hydrophobic fine particles are distributed, the hydrophobic fine particles having a floatability of not less than 40% and thus exhibiting a very high hydrophobic property.

The floatability stands for a methanol content (volumetric percentage) of a mixed solvent of when the fine particles start precipitating, the mixed solvent being prepared by mixing water and methanol together at various mixing ratios and the fine particles being added slowly into the mixed solvent. For example, the fine silica particles of which the surfaces have not been treated are highly hydrophilic and, therefore, have a floatability that is almost 0%. On the other hand, a highly hydrophobic powder such as Teflon does not sink in water and, therefore, has a floatability which is almost 100%. The hydrophobic fine particles used in the invention have a floatability of not less than 40% and, therefore, exhibit a particularly high hydrophobic property.

The hydrophobic fine particles that exhibit such a high hydrophobic property are obtained by modifying the surfaces of fine particles of a metal oxide such as silica, alumina or titanium oxide with a hydrophobic functional group.

As the hydrophobic functional group, there can be exemplified a functional group that exhibits a critical surface tension of not more than 30 mJ/m$^2$, such as alkyl group like methyl group, alkylsilyl group like methylsilyl group, or fluoroalkyl group and fluoroalkylsilyl group.

Modification with the hydrophobic functional group is carried out relying on the coupling or coating by using a hydrophobic agent having a functional group (e.g., silane compound, siloxane compound, silazane compound, titanium alkoxide compound, etc.).

The present invention, particularly preferably, uses hydrophobic fine silica particles from the standpoint of cost and easy availability and, most preferably, uses hydrophobic fine silica particles having the surfaces modified with the dimethylsilyl group.

The above hydrophobic fine particles must have a BET specific surface area of not less than 300 m$^2$/g and, preferably, not less than 400 m$^2$/g so as to exhibit excellent water-sliding property. The surface having excellent water-sliding property can be obtained even if the resin is not deposited with the hydrophobic fine particles but is blended with the hydrophobic fine particles in small amounts (e.g., 40 to 300 parts by weight and, specifically, 40 to 200 parts by weight per 100 parts by weight of the resin). Therefore, the resin does not lose its formability and is capable of exhibiting excellent water-sliding property in the form of films and bottles. If there are used hydrophobic fine particles having a BET specific surface area less than the above range, it becomes difficult to obtain excellent water-sliding property. If it is attempted to obtain the surface having excellent water-sliding property by blending the resin with the hydrophobic fine particles, then it becomes necessary to add the hydrophobic fine particles in very large amounts. As a result, the resin loses the formability and, after all, it becomes difficult to obtain the water-sliding property.

The hydrophobic fine particles can be produced by a method known per se. without any particular limitation so far as the BET specific surface area thereof lies within the above-mentioned range. If described with reference, for example, to silica, the fine silica particles are produced by a dry method based on the flame reaction of a silicon compound such as silane or siloxane, by a sol-gel method based on the hydrolysis and condensation of an alkoxysilane, or by a wet method based on the reaction of the sodium silicate with an acid, followed by the treatment for rendering them hydrophobic. The reaction conditions may be so set that there can be obtained a desired BET specific surface area and hydrophobic property (floatability).

<Resin Formed Body>

In the invention, there is no specific limitation on the resin that is used for producing the resin formed body if it is capable of forming the surface on where the hydrophobic fine particles are distributed (hereinafter called water-sliding surface). Namely, various kinds of resins can be used depending on the use, such as thermoplastic resin or thermosetting resin. If the water sliding surface is to be formed by externally adding the hydrophobic fine particles, however, it is desired to use a dispersion solution obtained by dispersing the hydrophobic fine particles and the resin in a dispersing medium. Further, if the water-sliding surface is to be formed by internally adding the hydrophobic fine particles, it is desired to use the thermoplastic resin.

As the solvent to be used as the dispersion medium, though not limited thereto only, there can be used alcohols such as methyl alcohol, ethyl alcohol, isopropyl alcohol, allyl alcohol, ethylene glycol, propylene glycol, 3-methoxy-3-methyl-1-butanol and 1-methoxy-2-propanol; ketones such as acetone and ethyl methyl ketone; ethers such as dimethyl ether, ethyl methyl ether, diethyl ether and dibutyl ether; esters such as ethyl acetate; polar solvents such as water; and non-polar solvents such as hexane, n-hexane, heptane and isooctane. There can be, further, suitably added dispersant and viscosity-adjusting agent within ranges in Which they will not impair the properties.

As the thermoplastic resin, there can be exemplified low-density polyethylene, high-density polyethylene, polypropylene, poly 1-butene, poly 4-methyl-1-pentene, or polyolefins such as random or block copolymer of α-olefins like ethylene, propylene, 1-butene or 4-methyl-l-pentene, or cyclic olefin copolymers; as well as ethylene•vinyl compound copolymer, such as ethylene•vinyl acetate copolymer, ethylene•vinyl alcohol copolymer and ethylene•vinyl chloride copolymer; styrene resins such as polystyrene, acrylonitrile•styrene copolymer, ABS and α-methylstyrene•styrene copolymer; polyvinyl compounds such as polyvinyl chloride, polyvinylidene chloride, vinyl chloride•vinylidene chloride copolymer, methyl polyacrylate and methyl polymethacrylate; polyamides such as nylon 6, nylon 6-6, nylon 6-10, nylon 11 and nylon 12; thermoplastic polyesters such as polyethylene terephthalate (PET), polybutylene terephthalate and polyethylene naphthalate (PEN); polycarbonate, polyphenylene oxide, polyimide resin, polyamideimide resin, polyetherimide resin, fluorine-contained resin, allyl resin, polyurethane resin, cellulose resin, polysulfone resin, poiyethersulfone resin, ketone resin, amino resin, and biodegradable resin such as polylactic acid, as well as blends hereof or resins thereof that are being suitably modified by being copolymerized.

Specifically, in the field of packing materials, it is desired to use the olefin resin such as polyolefin or the polyester.

Moreover, the resin formed body formed from these resins may have a multilayered structure so far as it is capable of forming a water-sliding surface on where the hydrophobic fine particles are distributed. Depending on the use, further, the resin formed body may be blended with suitable additives (e.g., antioxidant, coloring agent, etc.).

As the base material in which the hydrophobic fine particles of the invention are to be distributed, there can be used any known materials, such as paper, resin (gas-barrier resin, resin containing oxygen absorbing agent), metal, deposition layer, glass, or fabric, which may be used alone, or in the form of a composite material•laminated material thereof. Further, the base material may be blended with suitable additives (e.g., organic·inorganic filler and the like).

The hydrophobic fine particles are distributed in the surface to such a degree that the angle at which 30 mg of pure water dropped on the surface starts falling (tilt angle of the surface with respect to the horizontal plane and on which pure water starts sliding down thereon) is not more than 5°, preferably, not more than 3° and, most preferably, not more than 1°. For example, to obtain such a sliding angle by the internal addition, the hydrophobic fine particles may be added in an amount of 40 to 300 parts by weight, preferably, 40 to 200 parts by weight, and most preferably, 40 to 100 parts by weight per 100 parts by weight of the resin that forms the surface. Namely, the present invention uses the hydrophobic fine particles having a large BET specific surface area and, therefore, exhibits water-sliding property that helps attain the above-mentioned sliding angle despite of a small amount of blending. The above sliding angle can also be attained even when the hydrophobic fine particles are used in amounts larger than the above range. In this case, however, the resin loses its formability and it becomes difficult to form the resin into a desired formed body.

<Form of the Resin Formed Body>

With the hydrophobic fine particles being distributed in the surface, the resin formed body of the present invention possesses the surface having excellent water-sliding property, and can be favorably used for a variety of applications utilizing its properties, such as the applications that require water-proof property and water-repelling property, and may assume the form adapted to the use (e.g., film, sheet, tray, cup, etc.). The resin formed body can, further, be obtained in the form of pouring fitting such as spout, or cap.

FIG. 1 shows a representative surface state of the resin formed body.

In FIG. 1, the formed body generally designated at 10 has the hydrophobic fine particles 11 distributed on the base material 13, and exhibits surface property or water-sliding property as an object comes in contact with the hydrophobic fine particles 11 distributed on the surface.

As means for distributing the hydrophobic fine particles 11 as described earlier, the base material 13 (or the surface of the base material 13) is formed by using a resin (resin for forming the surface) in which the hydrophobic fine particles of a predetermined amount have been dispersed as the resin (e.g., resin for forming the base material 13) that forms the surface. For instance, the surface having the hydrophobic fine particles distributed therein can be formed by dry-lamination, extrusion-lamination, coating or blowing. In the case of the coating, a layer of the hydrophobic fine particles 11 is formed on the base material. 13 by using a dispersed body obtained by dispersing the hydrophobic fine particles in a volatile solvent and, thereafter, conducting the step of drying. These methods are effective particularly when, for example, the base material 13 is in the form of a film.

In addition to the above methods, it is also allowable to obtain the formed body having the hydrophobic fine particles distributed on the surface by directly forming the base material 13 by using a resin in which the hydrophobic fine particles have been distributed in a predetermined amount.

If the resin is used as a packing material which is in the form of a film or a bottle, no limitation is imposed on the contents that are to be contained. Usually, however, there can be favorably contained viscous pastes or slurry fluid substances (e.g., having viscosities of not less than 100 mPa·s at 25° C.) or, concretely, ketchup, aqueous paste, honey, various kinds of sauces and viscous liquids in which solid components are dispersed like mayonnaise, mustard, jam, chocolate syrup, cosmetic liquid such as lotion, liquid detergent, shampoo, rinse and dressing. The resin formed body is also adapted to containing, for example, ketchup in which water is not emulsified on the surfaces of the content but is present by itself.

The resin formed body of the present invention can be used in the form of film, bottle, bag-like container (pouch), tray, cup, pouring fitting like spout, cap like hinged cap, and as a lid material.

EXAMPLES

The invention will now be described by way of Examples.
Described below are a variety of properties, methods of measuring properties and resins used for forming the films in Examples described below.
BET Specific Surface Area;
Various kinds of hydrophobic fine particles were dried in vacuum as a pretreatment, and were measured for their BET specific surface areas by using a fluid type automatic specific surface area measuring apparatus, FlowSorb II 2300, (Manufactured by Shimazu Seisakusho Co.).
Floatability;
Mixed solvents of pure water and methanol at dissimilar mixing ratios were provided. Fine particles were slowly added to these mixed solvents to make sure if the particles precipitated. The methanol content (volume percentage) in the mixed solvent of when the fine particles have precipitated was defined as floatability.
Water Sliding Angle (WSA);
A film prepared by a method described below was fixed onto a sample plate of a solid-liquid analyzing system, DropMaster 700, (manufactured by Kyowa Kaimen Kagaku Co.) such that the surface to be measured was facing upward. 30 Milligrams of distilled water was placed thereon under the conditions of 23° C. and 50% R.H. The base material was gradually tilted, and the tilt angle at which the water droplets started to fall was measured.
Water Contact Angle (WCA);
The film prepared by the method described below was fixed onto the sample plate of the solid-liquid analyzing system, DropMaster 700, (manufactured by Kyowa Kaimen Kagaku Co.) such that the surface to be measured was facing upward. Three microliters of distilled water was placed thereon under the conditions of 23° C. and 50% R.H, and the angle (contact angle) subtended by the water droplet relative to the film was measured.

Example 1

The following hydrophobic silica was provided as hydrophobic fine particles a.
Hydrophobic Silica;
BET specific surface area: 510 m$^2$/g
Surface functional group: dimethylsilyl group
Floatability: 40%
0.50 Grams of a polyester resin (Vylon 200, manufactured by Toyobo Co.) and 10.0 g of methyl ethyl ketone (hereinafter MEK, manufactured by Wako Junyaku Co.) were weighed in a vial. By using a stirrer, the polyester resin was dissolved therein with stirring. Further, 0.20 g of the above hydrophobic fine particles a (hydrophobic silica) were added thereto and were stirred for 2 hours by using the stirrer. The resulting mixed liquid was applied onto a 100 μm-thick PET film (Lumirror 100T60, manufactured by Toray Co.) by using a bar coater (#9) and was, thereafter, dried for 3 minutes in an oven heated at 120° C. By using the thus prepared film, the water sliding angle (WSA) and the water contact angle (WCA) were measured to obtain the results as shown in Table 1.

Example 2

A film was prepared in the same manner as in Example 1 but adding the hydrophobic fine particles a in an amount of 0.50 g, and was measured to obtain the results as shown in Table 1.

Example 3

A film was prepared in the same manner as in Example 1 but adding the hydrophobic fine particles a in an amount of 0.80 g, and was measured to obtain the results as shown in Table 1.

Example 4

A film was prepared in the same manner as in Example 2 but using no polyester resin, and was measured to obtain the results as shown in Table 1.

Reference Example 1

A film was prepared in the same manner as in Example 1 but adding the hydrophobic fine particles a in an amount of 0.15 g, and was measured to obtain the results as shown in Table 1.

Comparative Example 1

The following hydrophobic silica was provided as hydrophobic fine particles b.
  Hydrophobic Silica (RX300 Manufactured by Nihon Aerosil Co.);
    BET specific surface area: 210 $m^2/g$
    Surface functional group: trimethylsilyl group
    Floatability: 65%
A film was prepared in the same manner as in Example 1 but using the above hydrophobic fine particles b in place of the hydrophobic fine particles a, and was measured to obtain the results as shown in Table 1.

Comparative Example 2

A film was prepared in the same manner as in Comparative Example 1 but adding the hydrophobic fine particles b in an amount of 0.50 g, and was measured to obtain the results as shown in Table 1.

Comparative Example 3

A film was prepared in the same manner as in Comparative Example 1 but adding the hydrophobic fine particles b in an amount of 0.80 g, and was measured to obtain the results as shown in Table 1.

Comparative Example 4

A film was prepared in the same manner as in Comparative Example 2 but using no polyester resin, and was measured to obtain the results as shown in Table 1.

Comparative Example 5

The following hydrophobic silica was provided as hydrophobic fine particles c.
  Hydrophobic Silica (R972 Manufactured by Nihon Aerosil Co.);
    BET specific surface area: 110 $m^2/g$
    Surface functional group: dimethylsilyl group
    Floatability: 45%
A film was prepared in the same manner as in Example 1 but using the above hydrophobic fine particles c in place of the hydrophobic fine particles a, and was measured to obtain the results as shown in Table 1.

Comparative Example 6

A film was prepared in the same manner as in Comparative Example 5 but adding the hydrophobic fine particles c in an amount of 0.50 g, and was measured to obtain the results as shown in Table 1.

Comparative Example 7

A film Was prepared in the same manner as in Comparative Example 5 but adding the hydrophobic fine particles c in an amount of 0.80 g. and was measured to obtain the results as shown. in Table 1.

Comparative Example 8

A film was prepared in the same manner as in Comparative Example 6 but using no polyester resin, and was measured to obtain the results as shown in Table 1.

Comparative Example 9

A film was prepared in the same manner as in Comparative Example 1 but using no hydrophobic fine particle, and was measured to obtain the results as shown in Table 1.

TABLE 1

|  | Hydrophobic fine particles | | | | Polyester resin | Measured results | |
| --- | --- | --- | --- | --- | --- | --- | --- |
|  | BET specific surface area [$m^2/g$] | Functional group | Floatability [%] | Weight [g] | Weight [g] | WSA [deg] | WCA [deg] |
| Example 1 | 520 | dimethylsilyl group | 40 | 0.20 | 0.50 | 2 | 159 |
| Example 2 | ↑ | ↑ | ↑ | 0.50 | ↑ | n.d.* | n.d. |
| Example 3 | ↑ | ↑ | ↑ | 0.80 | ↑ | ↑ | ↑ |
| Example 4 | ↑ | ↑ | ↑ | 0.50 | — | ↑ | ↑ |
| Ref. Ex. 1 | ↑ | ↑ | ↑ | 0.15 | 0.50 | >90 | 129 |
| Comp. Ex. 1 | 210 | trimethylsilyl group | 65 | 0.20 | 0.50 | >90 | 113 |

TABLE 1-continued

| | Hydrophobic fine particles | | | | Polyester resin | Measured results | |
|---|---|---|---|---|---|---|---|
| | BET specific surface area [m²/g] | Functional group | Floatability [%] | Weight [g] | Weight [g] | WSA [deg] | WCA [deg] |
| Comp. Ex. 2 | ↑ | ↑ | ↑ | 0.50 | ↑ | 47 | 140 |
| Comp. Ex. 3 | ↑ | ↑ | ↑ | 0.80 | ↑ | n.d. | n.d. |
| Comp. Ex. 4 | ↑ | ↑ | ↑ | 0.50 | — | ↑ | ↑ |
| Comp. Ex. 5 | 110 | dimethylsilyl group | 45 | 0.20 | 0.50 | 72 | 150 |
| Comp. Ex. 6 | ↑ | ↑ | ↑ | 0.50 | ↑ | 22 | 153 |
| Comp. Ex. 7 | ↑ | ↑ | ↑ | 0.80 | ↑ | 21 | 152 |
| Comp. Ex. 8 | ↑ | ↑ | ↑ | 0.50 | — | 3 | 163 |
| Comp. Ex. 9 | — | — | — | — | 0.50 | 34 | 71 |

*n.d.; Could not be measured since WSA was <1. High water-sliding property was exhibited.

The measured results of sliding angles and contact angles tell that in Comparative Examples 5 to 8 using the hydrophobic fine particles having a surface functional group of dimethylsilyl group and a BET specific surface area of 110 m²/g, the water-sliding properties were low and the sliding angle was 3° even by using the simple hydrophobic fine particles. On the other hand, high water-sliding properties were exhibited by all of Examples 1 to 4 that used the hydrophobic fine particles having the surface functional group of dimethylsilyl group and a BET specific surface area of 520 m²/g.

In the case of Comparative Examples 1 to 4 using the hydrophobic fine particles having the surface functional group of trimethylsilyl group and a BET specific surface area of 210 m²/g, though the hydrophobic fine particles possessed a floatability of as relatively high as 65%, high water-sliding properties were not obtained unless the hydrophobic fine particles were added in an amount of not less than 160 parts by weight per 100 parts by weight of the resin. On the other hand, in the case of Examples 1 to 4 using the hydrophobic fine particles having the surface functional group of dimethylsilyl group and a BET specific surface area of 520 m²/g, though the hydrophobic fine particles possessed a floatability of as low as 40%, high water-sliding properties were exhibited with the addition of an amount of 40 parts by weight per 100 parts by weight of the resin. Here, it is learned that Example 1 with the addition of an amount of 40 parts by weight per 100 parts by weight of the resin is exhibiting water-sliding property higher than that of Reference Example 1 that used the hydrophobic fine particles in an amount of 30 parts by weight per 100 parts by weight of the resin 100.

From the foregoing, to realize very high water-sliding property, specifying the kind of the hydrophobic surface functional group is effective to a certain degree but it is obvious that the BET specific surface is playing a more important role. It is, therefore, learned that upon using the hydrophobic fine particles haying a large BET specific surface area, a very high water-sliding property can be obtained despite the amount of use thereof is small.

DESCRIPTION OF REFERENCE NUMERALS

10: resin formed body
11: hydrophobic fine particles
13: base material

The invention claimed is:

1. A resin formed body having a surface in which hydrophobic fine particles are distributed, (a) said hydrophobic fine particles are dispersed in a surface resin layer that forms the surface of said resin formed body in an amount of 40 to 100 parts by weight per 100 parts by weight of the resin, said hydrophobic particles being dispersed so as to be partly exposed on the surface of the resin formed body;
   (b) said hydrophobic fine particles have a BET specific surface area of not smaller than 400 m²/g; and
   wherein the surface of the resin formed body in which said hydrophobic fine particles are distributed has a sliding angle of not more than 5°, the sliding angle being defined as a tilt angle of said surface with respect to the horizontal plane and on which a 30 mg of pure water that is dropped thereon slides down thereon.

2. The resin formed body according to claim 1, wherein said hydrophobic fine particles are fine silica particles having a hydrophobic functional group introduced into the surfaces thereof.

3. The resin formed body according to claim 2, wherein said hydrophobic functional group is an alkylsilyl group, an alkyl group, a fluoroalkylsilyl group or a fluoroalkyl group.

4. The resin formed body according to claim 1, wherein said resin formed body has the form of a film, and said hydrophobic fine particles are distributed on said film.

5. The resin formed body according to claim 1, wherein said resin formed body has the form of a bottle, and said hydrophobic fine particles are distributed in an inner surface or in a mouth portion of said bottle.

6. The resin formed body according to claim 1, wherein said resin formed body has the form of a pouring fitting or a cap, and said hydrophobic fine particles are distributed in a portion that turns into a content solution pouring passage in the pouring fitting or in the cap.

7. The resin formed body according to claim 1, wherein said resin formed body has the form of a tray, and said hydrophobic fine particles are distributed on an inner surface of said tray.

8. The resin formed body according to claim 1, wherein said resin formed body has the form of a cup, and said hydrophobic fine particles are distributed on an inner surface of said cup.

9. The resin formed body according to claim 1, wherein hydrophobic particles having a BET specific surface area of less than 400 m²/g are substantially not present in the surface resin layer that forms the resin formed body.

10. A resin formed body having a surface in which hydrophobic fine particles are distributed, (a) said hydrophobic fine particles are dispersed in a surface resin layer that forms the surface of said resin formed body in an amount of 40 to 100 parts by weight per 100 parts by weight of the resin, said hydrophobic particles being dispersed so as to be partly exposed on the surface of the resin formed body;
- (b) said hydrophobic fine particles have a BET specific surface area of not smaller than 400 m²/g; and wherein said resin formed body has the form of a bottle, and said hydrophobic fine particles are distributed in an inner surface or in a mouth portion of said bottle.

11. A resin formed body having a surface in which hydrophobic fine particles are distributed, (a) said hydrophobic fine particles are dispersed in a surface resin layer that forms the surface of said resin formed body in an amount of 40 to 100 parts by weight per 100 parts by weight of the resin, said hydrophobic particles being dispersed so as to be partly exposed on the surface of the resin formed body;
- (b) said hydrophobic fine particles have a BET specific surface area of not smaller than 400 m²/g; and wherein said resin formed body has the form of a pouring fitting or a cap, and said hydrophobic fine particles are distributed in a portion that turns into a content solution pouring passage in the pouring fitting or in the cap.

12. A resin formed body having a surface in which hydrophobic fine particles are distributed, (a) said hydrophobic fine particles are dispersed in a surface resin layer that forms the surface of said resin formed body in an amount of 40 to 100 parts by weight per 100 parts by weight of the resin, said hydrophobic particles being dispersed so as to be partly exposed on the surface of the resin formed body;
- (b) said hydrophobic fine particles have a BET specific surface area of not smaller than 400 m²/g; and wherein said resin formed body has the form of a tray, and said hydrophobic fine particles are distributed on an inner surface of said tray.

* * * * *